INVENTORS
JAMES H. BROWN and
ELZA F. BURCH
By Donald G. Dalton
Attorney

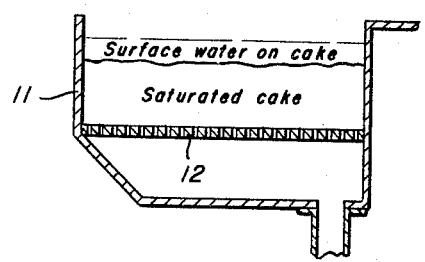
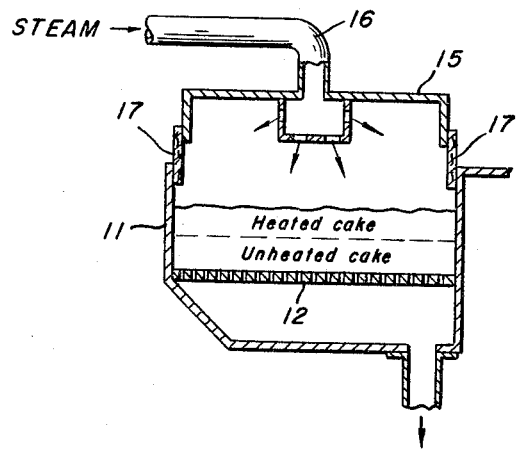
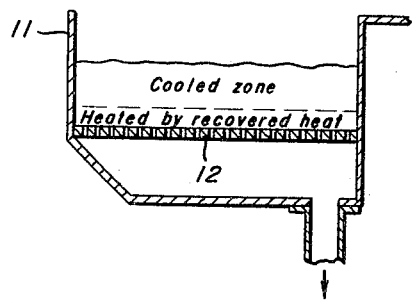

United States Patent Office 3,319,789
Patented May 16, 1967

3,319,789
METHOD OF FILTERING LIQUID FROM SOLID PARTICLES
James H. Brown, Penn Hills Township, Allegheny County, and Elza F. Burch, Monroeville Borough, Pa., assignors to United States Steel Corporation, a corporation of Delaware
Filed Apr. 9, 1964, Ser. No. 358,518
1 Claim. (Cl. 210—67)

This invention relates to the separation of liquid from solids and, in particular, to steam-assisted filtration, e.g., the removal of water from a slurry of coal or ore particles.

It has been established that the application of steam to a filter cake increases the readiness of the retained liquid to separate therefrom and, therefore, the ultimate dryness of the solids recovered. We have discovered that, in applying this principle, improved economy in the use of steam may be achieved by admitting steam to the cake only long enough to heat the upper stratum thereof and thereafter drawing air or other gas through the cake to recover the heat absorbed in the upper stratum and transfer it to the lower stratum. By this practive, the same heat which facilitates the drainage of liquid from the upper stratum also similarly serves the lower stratum. We preferably carry out our method on a continuous or traveling filter, an example of which is the horizontal rotary vacuum filter manufactured by Dorr-Oliver, Inc., Stamford, Conn., and described in its Bulletin No. 7201.

More particularly, we form a filter cake by discharging feed slurry onto a traveling liquid-permeable medium and then, as soon as the liquid has disappeared from the surface of the cake, under the vacuum to which the medium is subjected, we admit steam to the top of the cake until it has been heated by condensation of steam, down to a level intermediate the top and bottom of the cake and at least half way down from the top. This steam infusion causes a further separation of liquid from the upper stratum of the cake. We then admit cool dry air or other gas in lieu of the steam. The air in traveling down through the cake facilitates the transfer of hat from the upper stratum to the lower stratum, thus achieving for the latter a readiness of the water content to separate therefrom, the same as previously accomplished for the upper stratum.

A complete understanding of the invention may be obtained from the following detailed description and explanation which refer to the accompanying drawings illustrating the present preferred embodiment. In the drawings:

FIGURES 2, 3 and 4 are partial sections taken along the planes of lines II—II, III—III and IV—IV of FIGURE 1, respectively.

Figure 1:
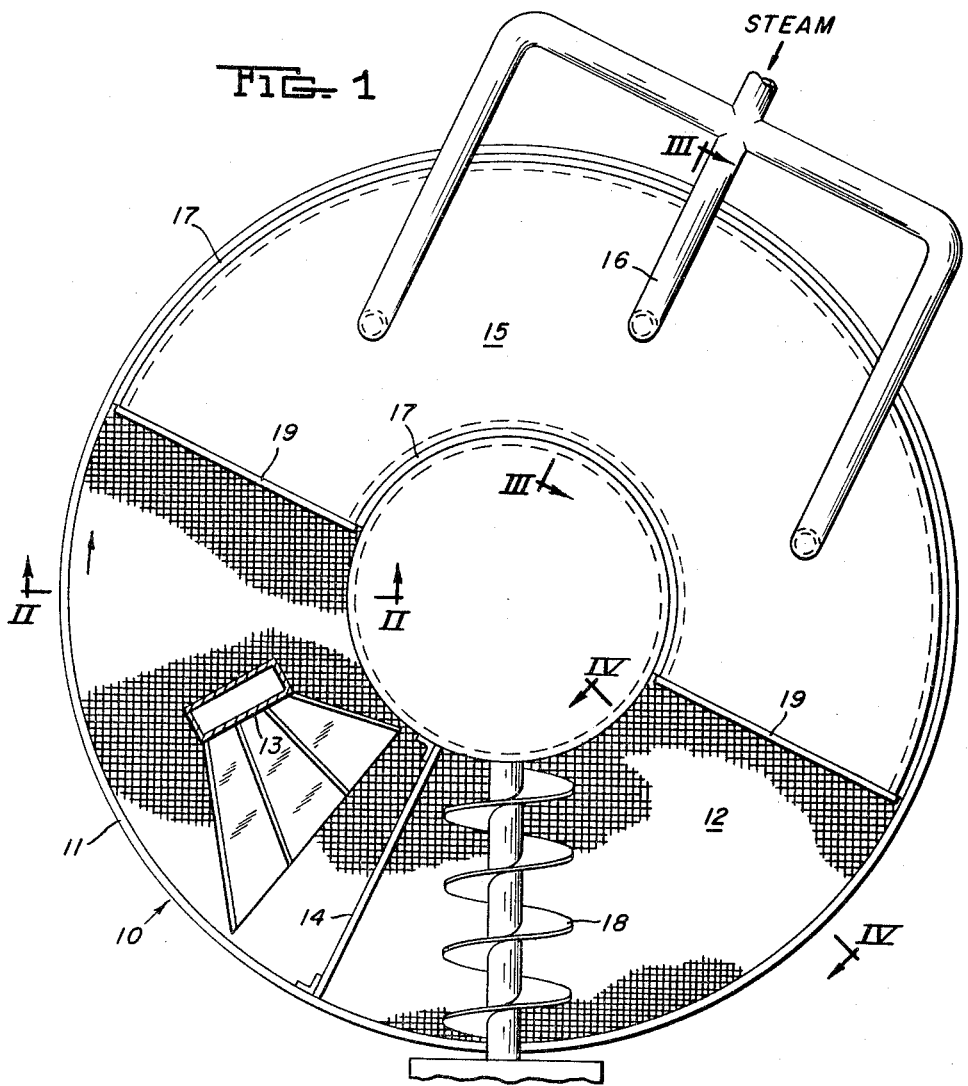
FIGURE 1 is a plan view of the horizontal rotary vacuum filter, largely diagrammatic, showing a modification thereof for the practice of our invention.
Figure 5:
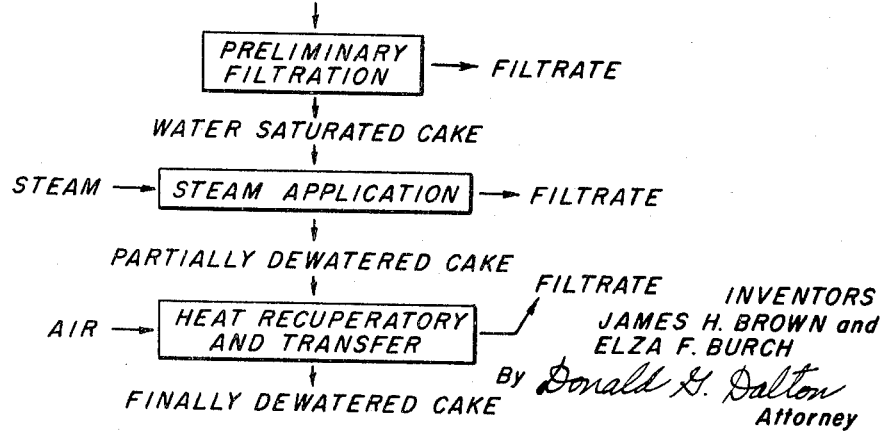
FIGURE 5 is a flow sheet showing the several steps of our method.

The broad outline of our method may be most readily observed from the flow sheet of FIGURE 5. As there indicated, a water slurry of coal particles, ¼" x 0 in size, or iron ore concentrate —10 mesh, is fed to a continuous vacuum filter of any suitable type, such as the Dorr-Oliver filter identified above. Preliminary filtration (stage 1) ensues immediately, quickly resulting in the separation as filtrate of most of the water content of the slurry, leaving behind a saturated solids cake of substantial thickness, say 1" to 3" or more, containing perhaps as much as 20% water by weight.

As soon as the surface water has seeped through the filter cake built up on the permeable member of the filter, we admit dry superheated steam onto the top of the cake. Preferably the steam is at a temperature between 212° and 300° F., e.g., 270° F. and at least about atmospheric pressure. The steam is drawn through the cake by vacuum, infuses it and heats the upper stratum of the cake by condensation as it passes therethrough (stage 2). The resulting increase in the temperature of such stratum releases additional water therefrom by reducing the surface tension and viscosity as aforesaid. The water thus released escapes as filtrate. The application of steam is continued until the partially dewatered cake has been heated to an intermediate level, preferably at least half of its depth, going down from the top. At this stage we discontinue the admission of steam and admit air or other gas at atmospheric temperature to the top of the cake (stage 3).

The air traversing the upper stratum of the cake absorbs heat therefrom and facilitates evaporation of water, then passes down to the lower stratum which is still at substantially the feed temperature. On contact the hot air transfers heat to the lower stratum, and simultaneously the water vapor condenses also transferring heat to the lower stratum. Thereby the lower stratum is heated to a temperature intermediate the feed temperature and that to which the upper stratum was heated by steam. The increase in the temperature of the lower stratum releases further water therefrom which runs off as filtrate, leaving the finally dewatered cake with a low moisture content, or a good state of dryness. It will be observed from FIGURE 5 that the three stages of our method are preliminary filtration, steam application and heat recuperation and transfer, with water removal accompanying each step.

FIGURES 1–4 show one form of apparatus which may be used for carrying out our method. A rotary vacuum filter 10, such as the aforementioned Dorr-Oliver device, has a rotating table 11 with a deck 12 of permeable material to which suction is uniformly applied from below by a vacuum pump. Normally, there is a differential of, say 5 inches of mercury between the pressure on top of the permeable material and that below it. A feed chute 13 discharges a slurry of solids and water, in approximately equal amounts, onto deck 12, against a dam 14 extending radially thereof. The table 11 is driven clockwise and, during the first 90°, approximately, of its rotation, the initial stage of preliminary filtration shown in FIGURE 5 is effected. This is illustrated more clearly in FIGURE 2.

A stationary hood 15 overlies about 180° of the table's circumference opposite the feed nozzle and has steam-inlet pipes 16 connected thereto. Thus, as the filter cake left on deck 12 after preliminary filtration traverses the second and third quadrants of its circular travel, it is subjected to steam-assisted filtration or dewatering by steam infusion, i.e., the second stage shown in FIGURE 5. This is illustrated in detail in FIGURE 3. As there shown, a seal strip 17 closes the space between the stationary hood 15 and rotating table 11. The ends of the hood may be closed by flexible curtains 19.

After passing out from under hood 15, the filter cake is subjected to the downflow of air therethrough, under the vacuum existing below deck 12, and this performs the third stage of heat recuperation and transfer shown in FIGURE 5, specifically illustrated in FIGURE 4. The finally dried solids are then removed from the deck by screw conveyor 18.

The increase in moisture removal made possible by our method is evident from Table I below, giving the results of conventional filtration (no steam or air application, shown in Test #1), conventional filtration plus steam-assisted filtration (steam application only, no air, Tests #2 and #3) and the three stage method of our invention (preliminary filtration, steam application and heat recuperation and transfer by air flow, Tests #4 and #5).

TABLE I

| Test No. | Steam time, sec. | Air time, sec. | Final water content, percent |
|---|---|---|---|
| 1 | 0 | 0 | 5 to 6 |
| 2 | 30 | 0 | 1.0 |
| 3 | 45 | 0 | 0.7 |
| 4 | 22½ | 7½ | 0.5 |
| 5 | 33½ | 11½ | 0.4 |

The advantage of our invention is the steam economy resulting from the fact that we do not continue the application of steam until the entire thickness of the filter cake has been heated directly by steam condensation. In addition to transferring heat, the air flow also further dries by evaporation the upper stratum which has already had the benefit of steam-assisted filtration.

Although we have disclosed herein the preferred embodiment of our invention, we intend to cover as well any change or modification therein which may be made without departing from the spirit and scope of the invention.

We claim:

A method of separating liquid from solids suspended therein comprising depositing a slurry of said liquid and solids onto the upper surface of a traveling horizontal permeable medium at one point in its travel, applying a partial vacuum to the lower surface of said medium to withdraw liquid from the slurry and form a filter cake on said upper surface, moving the medium and cake under a steam discharge hood substantially immediately after free liquid has disappeared from the surface of the cake, passing dry super-heated steam from said hood through the cake in an amount sufficient to heat only a stratum of an cake near the upper surface and assist further withdrawal of liquid therefrom by lowering the viscosity of said liquid, moving the medium and cake away from said hood, drawing atmospheric air through said medium and cake, which air is heated by contact with the heated stratum and conveys heat to the remainder of the cake, and removing solids from said medium.

References Cited by the Examiner
UNITED STATES PATENTS

| | | | |
|---|---|---|---|
| 1,654,629 | 1/1928 | Baylis | 210—68 X |
| 2,256,017 | 9/1941 | Curran. | |
| 3,143,497 | 8/1964 | Fuehring | 210—68 X |
| 3,218,313 | 11/1965 | Blankenship | 210—68 X |

FOREIGN PATENTS 1,146,849  4/1963  Germany.

SAMIH N. ZAHARNA, *Primary Examiner.*

REUBEN FRIEDMAN, *Assistant Examiner.*